Feb. 8, 1966  T. W. BANNON  3,233,750
GRIPPING AND RELEASING DEVICE FOR FEED MECHANISMS
Filed July 5, 1963  4 Sheets-Sheet 1
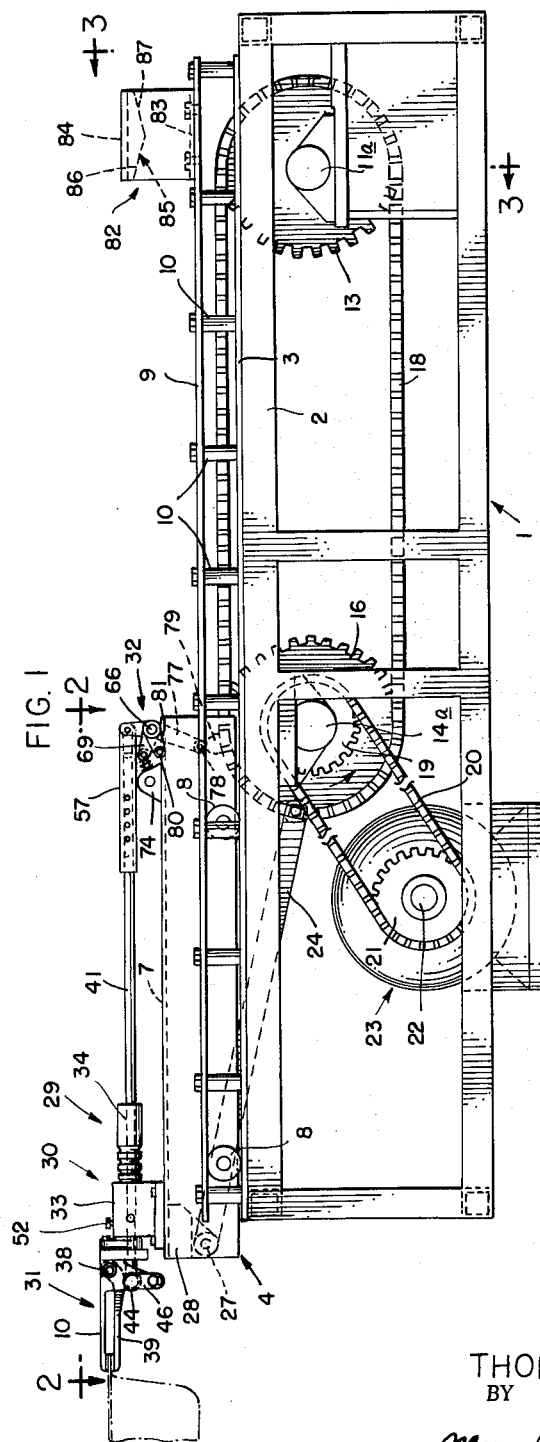
INVENTOR:
THOMAS W. BANNON
BY
Marzall, Johnston, Cook & Root.
ATT'YS Feb. 8, 1966     T. W. BANNON     3,233,750
GRIPPING AND RELEASING DEVICE FOR FEED MECHANISMS
Filed July 5, 1963     4 Sheets-Sheet 2
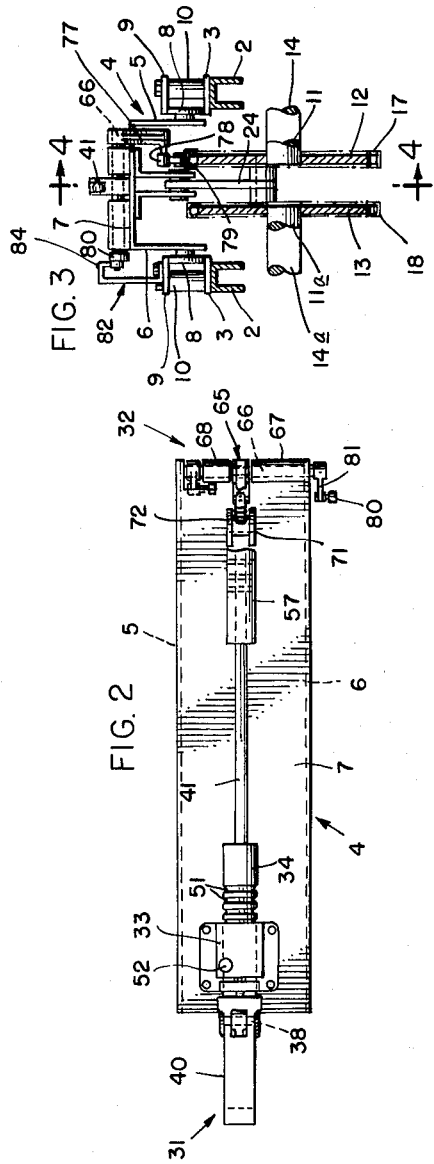
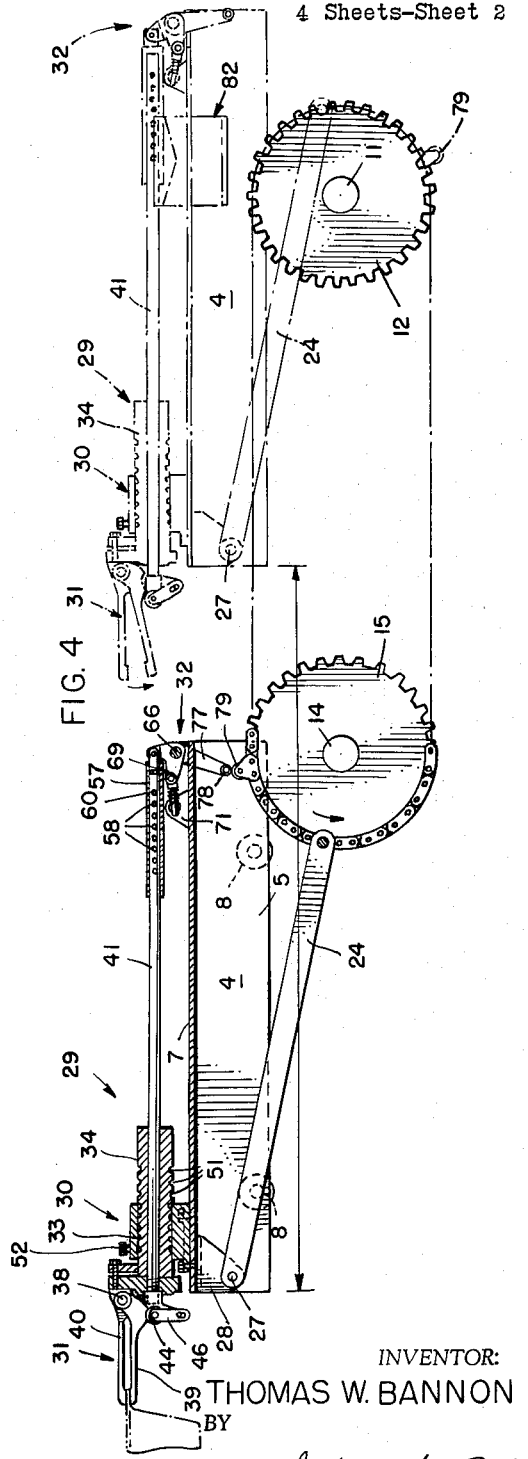
INVENTOR:
THOMAS W. BANNON
BY
Marzall, Johnston, Cook & Root.
ATT'YS Feb. 8, 1966   T. W. BANNON   3,233,750
GRIPPING AND RELEASING DEVICE FOR FEED MECHANISMS
Filed July 5, 1963   4 Sheets-Sheet 3

INVENTOR:
THOMAS W. BANNON
BY
Marzall, Johnston, Cook & Root.
ATT'YS

Feb. 8, 1966  T. W. BANNON  3,233,750
GRIPPING AND RELEASING DEVICE FOR FEED MECHANISMS
Filed July 5, 1963  4 Sheets-Sheet 4
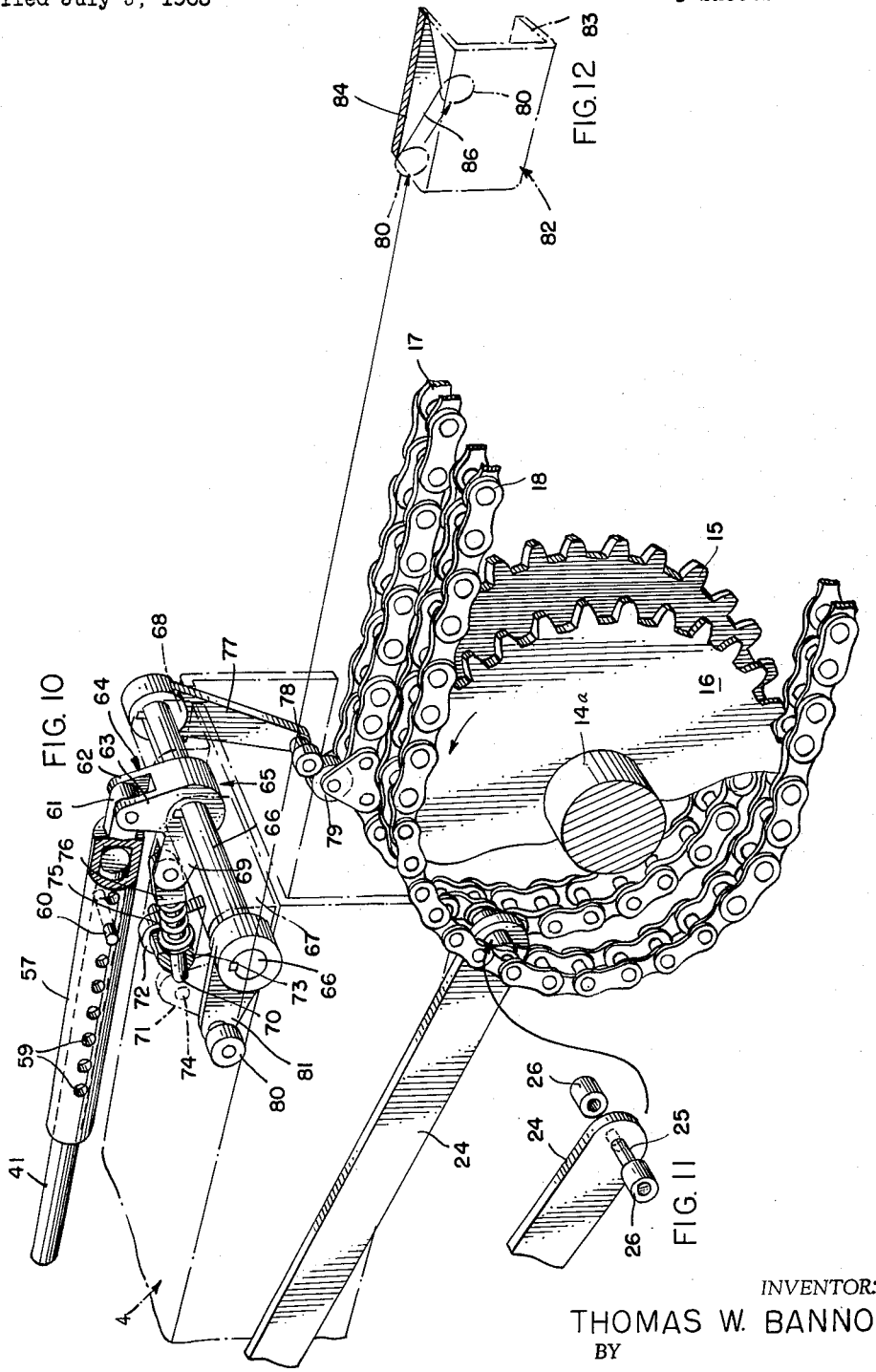
INVENTOR:
THOMAS W. BANNON
BY
Marzall, Johnston, Cook & Root
ATT'YS ated Feb. 8, 1966

United States Patent Office 3,233,750
GRIPPING AND RELEASING DEVICE FOR
FEED MECHANISMS
Thomas W. Bannon, La Grange Park, Ill., assignor to
U.S. Industries, Inc., New York, N.Y., a corporation
of Delaware
Filed July 5, 1963, Ser. No. 292,962
9 Claims. (Cl. 214—1)

This invention relates in general to feeding devices for feeding a workpiece from a first position where it has been operated upon by a machine, such as a metal working press, to a second position away from or out of the machine which performed the operation. More particularly, the invention is directed to a gripping and releasing mechanism operable to grip the workpiece in the first position thereof, move it to the second position and then release it.

Although the feeding devices to which the present invention is intended to be applied may be of various types and intended for various uses, one particular use such feeding device may have is in connection with a line of presses, such as that shown in the copending application of Einar K. Johansen and Thomas W. Bannon, Serial No. 293,039 filed July 5, 1963.

Feeding devices of the general type disclosed herein and useful in such line of presses are adapted to move a workpiece which has been operated upon by one press from that press either to a second press or to a position intermediate of the two presses where the workpiece is released and conveyed therefrom by hand or by any suitable additional conveying means.

Heretofore in transferring workpieces from one press to another, or between first and second positions in a press line, comparatively complicated conveyor mechanism operated intermittently has been necessary. The present invention is designed to simplify considerably the means by which such a workpiece is to be transferred from one station to another.

It is, therefore, a principal object of the present invention to provide in a feeding device of the character mentioned above, a gripping and releasing device and mechanism to activate such device to grip a workpiece in one position thereof and to release the workpiece after conveying it to a second position.

Another object of the invention is to provide a feeding mechanism for a workpiece, which includes a reciprocable carriage provided thereon with gripping and releasing means operable to tightly grip the workpiece in one position of the carriage and to release the workpiece after movement of the carriage to a second position.

A further object of the invention is to provide in a feeding mechanism a gripping and releasing device mounted upon a carriage and movable therewith, together with operating means operable in timed relation with the movement of the carriage so as to activate said gripping device to the gripping position thereof when the carriage is in one position, and to release said device after the carriage has been moved to a second position.

Another and more specific object of the invention is to provide a gripping and releasing device for a feeding mechanism comprising a pair of jaws relatively movable toward each other to a clamping position and away from each other to a releasing position, and means to move said jaws from a first to a second position whereby the jaws may grip a workpiece in the said one position and move it to the second position where the jaws are opened, thereby to release the workpiece in said second position.

A still further specific object of the invention is to provide a novel mechanism for applying pressure to the gripping surfaces of the jaws so that a workpiece may be securely gripped between the jaws as it is being conveyed from one position to another.

Other objects and advantages of the invention will become apparent upon reading the following description taken in conjunction with the accompanying drawings, in which:

FIG. 1 is a side elevational view of a feeding mechanism illustrating the present invention as applied thereto;

FIG. 2 is a top plan view of that portion of the feeding mechanism which shows the gripping and releasing device and as taken along the plane of line 2—2 of FIG. 1;

FIG. 3 is a fragmentary vertical sectional view taken substantially along the plane of line 3—3 of FIG. 1;

FIG. 4 is a fragmentary longitudinal sectional view taken substantially along the plane of line 4—4 of FIG. 3;

FIG. 10 is a fragmentary perspective view on an enlarged scale showing the details of the operating mechanism which activates and de-activates the jaws of the gripping and releasing device;

FIG. 11 is a fragmentary exploded view of a portion of FIG. 10 as indicated by the arrow, and FIG. 12 is a perspective view of the means which causes the jaw-operating mechanism to operate to de-activate or release the gripping device.

Figure 6:
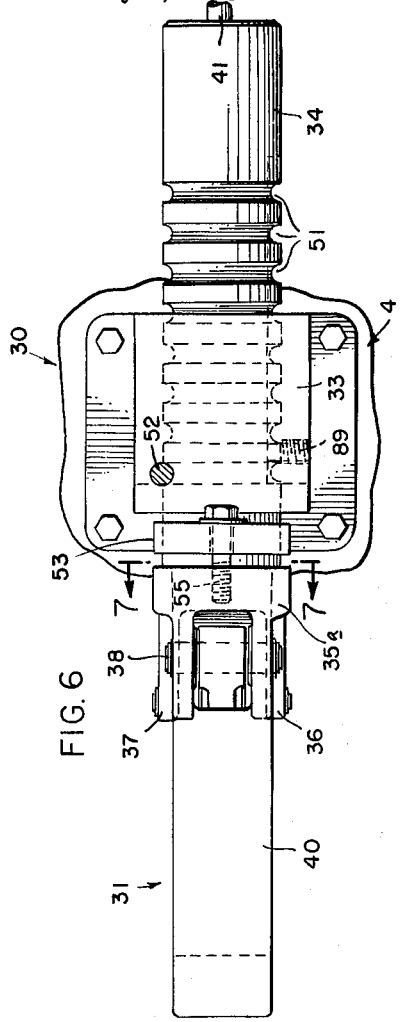
FIG. 6 is a top plan view of the device shown in FIG. 5.

The invention may be very briefly described herein as including a horizontally reciprocating carriage upon which is mounted a gripping and releasing device. The device itself is composed of a pair of jaws movable toward each other to a gripping position and away from each other to a releasing position. In the first or forward position of the carriage, the jaws are caused to close and to tightly grip a workpiece therebetween. Movement of the carriage to a second position will carry with it the gripping and releasing device as well as the workpiece. When the carriage reaches the second position, the operating mechanism for the jaws is operated upon to open the jaws and thus release the workpiece. The carriage and jaws then return to the first position to repeat the operation.

The present invention is not concerned with the manner in which the workpiece is removed from the feeding mechanism after it is released by the gripping and releasing device. As far as the invention herein is concerned, the workpiece could be removed by hand. In actual practice, however, the gripping and releasing device will convey the workpiece either to a so-called "flip-over" mechanism which will pick up the workpiece and deliver it to still another station, turning it over as it is being conveyed thereto, or to a conveyor which will convey or transfer the workpiece to another station, thus moving it out of the way and allowing the carriage of this invention to return to the first position thereof.

Referring now more particularly to the drawings and especially to FIG. 1, the feeding mechanism incorporates a stationary framework generally indicated by the numeral 1. A pair of spaced-apart channel members 2 are positioned at the upper part of the framework 1 upon which track members 3 are located.

A reciprocable carriage generally indicated by the numeral 4 is of an inverted U-shape and has the downwardly extending leg members 5 and 6 connected by the web 7. A plurality of rollers 8 are rotatably mounted on the legs 5 and 6 of the carriage 4 are are adapted to move the carriage back and forth along the tracks 3.

The carriage is guided along the tracks 3 and maintained thereon by the elongated bars 9 spaced upwardly above the tracks 3 by the spacer members 10 (see also FIG. 3).

Adjacent one end of the framework there are mounted stub shafts 11 and 11a which support a pair of spaced-apart sprockets 12 and 13 (FIG. 3). Forwardly of shafts 11 and 11a and near the center of the framework, a second pair of shafts 14 and 14a is located upon which the spaced-apart sprockets 15 and 16 are mounted (FIG. 10). Sprocket chains 17 and 18 pass around the sprockets 12, 15 and sprockets 13, 16, respectively.

A drive sprocket 19 mounted on shaft 14a has a chain 20 passing around it and around another sprocket 21 on shaft 22 of a suitable source of power generally indicated at 23. A similar drive arrangement is provided for the other shaft 14 which cannot be seen in the figures. It is sufficient to state that both shafts 14 and 14a are driven by the same power source simultaneously in the same direction. The power source operates to drive the shafts 14 and 14a in a counter-clockwise direction, as viewed in the various figures of the drawings, and consequently the sprocket 12, 13, 15, and 16, which in turn will move the upper reaches of the chains 17 and 18 toward the left, and the lower reaches thereof toward the right.

A link 24 is connected at one end by means of a suitable pin 25 and spacer members 26 to the chains 17 and 18 and therebetween. The opposite end of link 24 is secured by means, such as a pin 27, to a bracket 28 at one end of the carriage 4 and secured to the underside of the web 7.

It will thus far be clear that when the power source 23 is energized, the various sprockets will all be driven in a counter-clockwise direction and the link 24 will be moved toward the right, as viewed in FIGS. 1 and 4, from the full line position of FIG. 4 to the dot-dash line position thereof. The connection of link 24 at this other end to the carriage 4 will thereupon move the carriage along the tracks 3 from the full line position thereof in FIG. 4 to the dot-dash line position thereof.

The gripping and releasing device of the present invention is mounted upon the carriage 4 for movement therewith so that a workpiece gripped thereby may be transferred from one position to another in accordance with the movement of the carriage.

This gripping and releasing device is generally indicated by the numeral 29 and includes in general terms a supporting part 30, jaws 31, and operating mechanism 32 which is acted upon to activate the jaws 31 to their gripping position and to deactivate them to their releasing position.

The support 30 includes a supporting bracket member 33 mounted on top of the web 7 of the carriage 4. The bracket 33 is tubular and is adapted to receive a sleeve member 34. Reference to FIGS. 5 to 8, inclusive, will now be made to more clearly understand the preferred construction of this portion of the invention.

The outer end of sleeve 34 has mounted thereon the actual gripping and releasing device which includes a bracket member 35 which receives the sleeve 34 and has an upper part 35a extending upwardly therefrom. The upstanding portion 35a is bifurcated, as at 36 and 37 (FIGS. 6 and 8), and has a pivot pin 38 extending therebetween on which is pivotally mounted the lower jaw 39 of the pair of jaws generally identified by the number 31. The upper jaw 40 of this pair is formed as an integral part of the bracket 35 and is stationary.

Figures 5, 9:
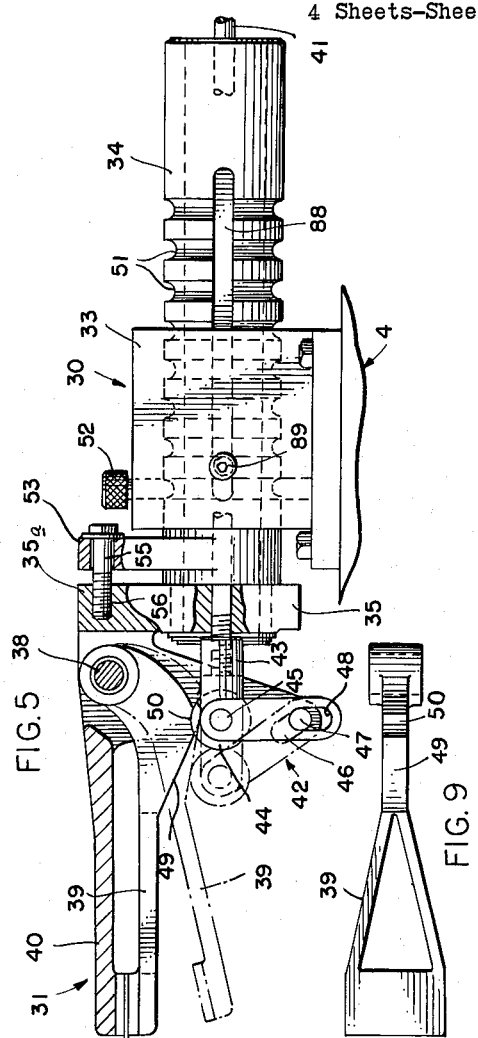
FIG. 5 is an enlarged fragmentary view of a portion of FIG. 1 showing the gripping and releasing mechanism in greater detail and with parts broken away for the sake of clarity.
FIG. 9 is a plan view of the lower jaw of the gripping and releasing device as shown in FIG. 5.
Figure 7:
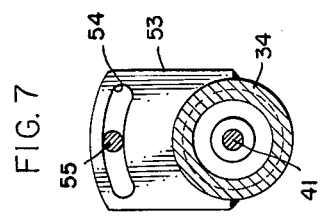
FIG. 7 is a transverse sectional view taken along the plane of line 7—7 of FIG. 6.
Figure 8:
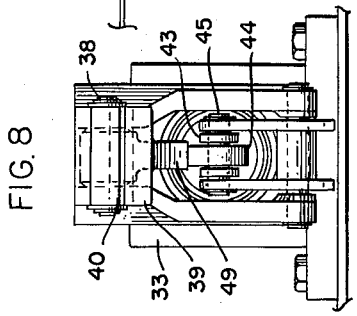
FIG. 8 is an end elevational view of the device shown in FIG. 5.

Force applied to the underside of the lower jaw 39 will obviously elevate it to the gripping position thereof, as shown in full lines in FIGS. 4 and 5. Such upward force is applied to the lower jaw 39 by means of a rod 41 slidably received within the sleeve 34 and having a threaded outer end, by means of which a lever arrangement 42 is connected. This lever arrangement includes an internally threaded member 43 adapted to receive the threaded end of rod 41 which has rotatably mounted at the outer end thereof a roller 44. The roller 44 is mounted on a pin 45 extending between the spaced sides of the member 43 and to which the spaced downwardly extending arms 46 are also mounted. The lower ends of the arms 46 are pivotally mounted between the spaced sides 36 and 37 by means of the pin 47 and slot 48.

The underside of jaw 39 has a sloping cam surface 49 in an arcuate recess 50, all as more clearly illustrated in FIG. 5.

When the rod 41 is in its outermost position shown by the dot-dash lines in FIG. 5, the lower jaw member 39 will pivot about its pin 38 and drop downwardly by gravity. When force is exercised upon rod 41 to move it inwardly or toward the right, as viewed in the figures, the roller 44 will be moved toward the right along the cam surface 49 of the lower jaw 39 and will elevate it to the gripping position thereof. Sufficient force exerted on the rod 41 to move it inwardly will eventually cause the roller 44 to become lodged in the arcuate recess 50, resulting in a locking of the lower jaw in its gripping position with the upper jaw under a sufficient force to grip and hold the workpiece and convey it to another position by movement of the carriage. The pin and slot connection 47 and 48 allows for such movement of the roller 44 in a horizontal direction.

It will be noted that the sleeve 34 is provided with a series of annular grooves 51 along its length adapted to receive a set screw 52 extending through the supporting bracket 33. This arrangement serves to hold the sleeve 34 stationary with respect to the rod 41 and to allow the rod to reciprocate within the sleeve.

On occasion it may be desirable to tilt the gripping jaws 31 a slight amount with respect to the horizontal in the event that the particular part of the workpiece to be grasped by the device is disposed at an angle. To accomplish this purpose an upwardly extending member 53 adjacent the forward end is formed integrally with, or is rigidly secured to, the sleeve 34. This member 53 has an arcuate slot 54 therein to receive the adjusting bolt 55. The bolt 55 is freely received within the slot 54 but is threaded at its outer end and is received within an internally threaded opening 56 in the member 35a. Thus when the bolt 55 is loosened, the entire jaw assembly is free to rotate with respect to the sleeve 35 through a predetermined radius. Tightening of the bolt 55 will secure the jaw assembly in its adjusted position.

The operating mechanism which is operable to reciprocate the rod 41 between its outer most position, allowing the lower jaw member to drop downwardly, and the innermost position thereof where the jaw is in its gripping position, is indicated generally by the numeral 32, and its operation may be understood more clearly by reference to FIGS. 1, 2, 3, 4, and 10.

The opposite end of rod 41 is received within the sleeve 57 and is secured thereto in any suitable manner so that the sleeve 57 and rod 41 will reciprocate together. In this particular instance the rod 41 is shown as having a plurality of holes 58 therethrough adapted to be brought into alignment with similar holes 59 in the sleeve 57 so that a pin 60 may be received by the aligned holes and thus secure the rod and sleeve together. The purpose of the series of holes is to allow lengthwise adjustment of the rod 41, as will be brought out more fully hereinafter.

The closed end of sleeve 57 is formed as shown at 61 to enable it to be received between the sides 62 and 63 of a bifurcated arm 64 of a bell crank lever 65. The bell crank lever 65 is keyed to a shaft 66 mounted in bearings 67 and 68 which are in turn secured to the web 7 of the carriage 4.

The other arm 69 of the bell crank lever 65 is also bifurcated and receives the end of a rod 70. The other end of rod 70 is received between the spaced support brackets 71 and 72 also mounted on the web 7 of the carriage 4. This end is slidably received within a mounting member 73 pivotally secured by pivot pin 74 extending between the brackets 71 and 72. A coiled compression spring 75 bears at one end against the mounting member 73 and at its other end against the stop member 76 formed integrally with the rod 70. When the bell crank lever 65 is caused to rotate so that the arm 69 thereof moves from an upper to a lower position, the rod 70 will move past dead center with respect to the arm 69 so that the spring 75 will hold the bell crank lever 65 in its upper or lower position.

It will be clear thus far that in the position of the parts shown in FIGS. 1, 2, 4, and 10, the arm 69 of the bell crank lever is in its uppermost position, whereupon rod 41 will be in its extreme position toward the right, as viewed in these figures, in which position the jaws will be closed to grip a workpiece. It will also be evident that when the shaft 66 is rotated in a counter-clockwise direction, the bell crank lever 65 will rotate with it to move the rod 41 toward the left and the rod 70 downwardly past dead center, thereupon releasing the jaws and allowing the lower jaw to drop downwardly.

The shaft 66 is caused to rotate in a clockwise direction to the position shown in FIGS. 1, 4 and 10 by movement of one of the chains. The shaft 66 has mounted at one end thereof a downwardly extending lever 77 with a roller 78 rotatably mounted at the outer end thereof. One of the chains, in this instance chain 17, has secured thereto a roller 79 which moves toward the left with the upper reach of the chain. Roller 78 on arm 77 is in the path of movement of the roller 79 so that as the roller 79 moves toward the left, it will contact roller 78, moving the arm 77 also toward the left and rotating the shaft 66 in a clockwise direction. When this occurs, the bell crank 65 will likewise rotate in a clockwise direction and the connection between the arm 64 of the bell crank and the rod 41 will cause the rod to move toward the right and clamp the jaws.

The various parts will remain in this position and will be locked there both by reason of the toggle arrangement, which includes the parts numbered 69 through 76, inclusive, and by reason of the positioning of the roller 44 in the arcuate recess 50 of the lower jaw member. The parts will remain in this position during movement of the carriage toward the right, as viewed in FIG. 4, at which time mechanism is operated to release the jaw. Such mechanism involves a roller 80 mounted on the outer end of an arm 81 keyed to the opposite end of shaft 66 from that on which the arm 77 is located. The other part of the mechanism which cooperates with the roller 80 is the channel-shaped member 82 mounted at one end of the framework on the track 9. This channel-shaped member has a lower leg 83 which is used to mount the member 82 on the frame and an upper leg 84. This upper leg has a down-turned portion 85 provided with the downwardly sloping front and rear surfaces 86 and 87 forming cam surfaces along which the roller 80 is adapted to move.

The cam surfaces 86 and 87 are positioned to be located in the path of movement of the roller 80 as the carriage is moved rearwardly carrying the workpiece between the jaws 31. As the carriage reaches the end of its rearward movement at the point where the workpiece is to be released, the roller 80 will come against the cam surface 86 which will thereupon move the roller 80 downwardly together with its arm 81, thereby rotating the shaft 66 in a counter-clockwise direction. As stated above, when this occurs, the arm 64 of the bell crank 65 will move toward the left and will forcibly disengage the roller 44 from the arcuate recess 50 and allow the lower jaw member 39 to drop downwardly in the manner heretofore described.

The roller 80 and its arm 81 will remain in the lowermost position thereof because of the fact that the toggle arrangement, including bell crank lever arm 69, will have moved downwardly past dead center so that the spring 75 will hold the toggle in this lower position.

After the workpiece has been released and moved from its released position by any suitable means, the carriage then returns to its original position where another workpiece is in place and where mechanism is operated as above described, to move the jaws 31 to clamping position on the next succeeding workpiece.

It will be noted that the sleeve 34 is provided with a longitudinally extended elongated recess 88 adapted to receive a set screw 89. This arrangement allows for longitudinal adjustment of the sleeve 34 and rod 41 whenever necessary because of the position or size of the workpiece. The entire gripping and releasing mechanism can be adjusted toward the left or right by loosening the set screw 89 and removing the pin 60 which connects the rod 41 with the sleeve 57 at the other end thereof. The set screw 52 will also be loosened out of engagement with one of the annular grooves 51, whereupon the sleeve 34 carrying the gripping and releasing device therewith may be adjusted longitudinally. The rod 41 will be movable therewith also and upon completion of the adjustment the parts may then be secured in place by replacing the pin 60 at one end of the rod 41 and tightening the set screws 52 and 89 into the sleeve 34 at the other end thereof.

From the foregoing description it will be evident that a novel form of gripping and releasing device has been provided having numerous advantages over those heretofore known. The device is caused to operate in a positive manner and the arrangement of the parts enables an extremely great pressure to be exerted between the gripping jaws, thereby to assure movement of the workpiece between the desired positions thereof.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. A gripping and releasing device for feeding mechanisms of the character herein described comprising,
   (a) a pair of jaws movable toward each other to gripping position and away from each other to releasing position,
   (b) a reciprocating member associated with said jaws and movable to a first position to cause said jaws to move toward each other, and movable to a second position to cause said jaws to move away from each other, and
   (c) means to reciprocate said member between said first and second positions thereof including
       (1) a bell crank lever rotatably mounted to reciprocate between two extreme positions and having one arm thereof connected to said member,
       (2) means to actuate said lever, and
       (3) a spring loaded toggle, one link of which consists of the other arm of said bell crank, whereby rotation of said bell crank to one of its extreme positions will move the joint of said toggle past dead center in one direction and thereby move said member to said first position thereof, and rotation of said bell crank to the other of its extreme positions will move the joint of said toggle past dead center in the other direction and thereby move said member to said second position thereof.

2. A feeding mechanism of the character described, comprising,
   (a) a carriage,
   (b) means to reciprocate said carriage between first and second positions,
   (c) a gripping and releasing device on said carriage adapted to grip a workpiece when said carriage is in one of said positions and to release said workpiece when said carriage is in the other of said positions,
(d) a toggle mechanism mounted on said carriage for operating said device and moving it to gripping and releasing positions, including
  (1) first link mounted for movement longitudinally thereof,
  (2) a second link, consisting of one arm of a bell crank, connected to said first link, and
  (3) means mounting said bell crank for rotation,
(e) connecting means between the second arm of said bell crank and said device,
(f) a first means operable to rotate said bell crank and actuate said toggle mechanism to move the joint thereof past dead center in one direction, when said carriage is in said one position, thereby to cause said connecting means to operate said device to grip a workpiece, and
(g) a second means operable to rotate said bell crank and actuate said toggle mechanism to move the joint thereof past dead center in the opposite direction, when said carriage is in said other position, thereby to cause said connecting means to operate said device to release a workpiece.

3. A feeding mechanism as defined in claim 2, wherein said toggle mechanism is spring loaded, thereby to maintain said device in gripping position under a predetermined positive mechanical force.

4. A feeding mechanism as defined in claim 2, wherein said means for mounting said bell crank for rotation includes a rock shaft to which said bell crank is keyed, and said first means comprises an arm extending laterally from said rock shaft, and means on the carriage reciprocating means and movable therewith to contact said arm and rotate said shaft and bell crank, and thereby to move the joint of the toggle past dead center.

5. A feeding mechanism of the character described comprising,
(a) a carriage,
(b) means to reciprocate said carriage between first and second positions,
(c) a gripping and releasing device on said carriage adapted to grip a workpiece when said carriage is in one of said positions and to release said workpiece when said carriage is in the other of said positions,
(d) a toggle mechanism also mounted on said carriage for operating said device and moving it to gripping and releasing positions, one link of said toggle mechanism including one arm of a bell crank lever,
(e) connecting means between the other arm of said bell crank lever and said device,
(f) a first means operable to actuate said toggle mechanism and move the joint thereof past dead center in one direction, when said carriage is in said one position, thereby to cause said connecting means to operate said device to grip a workpiece,
(g) and a second means operable to actuate said toggle mechanism and move the joint thereof past dead center in the opposite direction, when said carriage is in said other position, thereby to cause said connecting means to operate said device to release a workpiece.

6. A feeding mechanism as defined in claim 5, wherein said gripping and releasing device includes a pair of jaws movable toward each other to gripping position and away from each other to releasing position, and cam means associated with one of said jaws and operable by said connecting means to lock said jaws in gripping position.

7. A feeding mechanism as defined in claim 5, wherein said toggle mechanism is spring loaded, thereby to maintain said device in gripping position under a predetermined positive mechanical force.

8. A feeding mechanism of the character described comprising,
(a) carriage,
(b) means to reciprocate said carriage between first and second positions including spaced sprockets, at least one chain around said sprockets, and a link connected at one end to said carriage and at the other end to said chain,
(c) a gripping and releasing device on said carriage adapted to grip a workpiece when said carriage is in one of said positions and to release said workpiece when said carriage is in the other of said positions,
(d) a toggle mechanism also mounted on said carriage for operating said device and moving it to gripping and releasing positions,
(e) connecting means between said toggle mechanism and said device,
(f) a first means operable to actuate said toggle mechanism and move the joint thereof past dead center in one direction, when said carriage is in said one position, thereby to cause said connecting means to operate said device to grip a workpiece, said first means being mounted on said chain, whereby the gripping of said workpiece will occur while said carriage is substantially at rest, and
(g) a second means operable to actuate said toggle mechanism and move the joint thereof past dead center in the opposite direction, when said carriage is in said other position, thereby to cause said connecting means to operate said device to release a workpiece.

9. A feeding mechanism of the character described comprising,
(a) a carriage,
(b) means to reciprocate said carriage between first and second positions,
(c) a gripping and releasing device on said carriage adapted to grip a workpiece when said carriage is in one of said positions and to release said workpiece when said carriage is in the other of said positions, said device being rotatable thereby to enable said device to grip a workpiece in other than a horizontal plane,
(d) a toggle mechanism also mounted on said carriage for operating said device and moving it to gripping and releasing positions,
(e) connecting means between said toggle mechanism and said device,
(f) a first means operable to actuate said toggle mechanism and move the joint thereof past dead center in one direction, when said carriage is in said one position, thereby to cause said connecting means to operate said device to grip a workpiece, and
(g) a second means operable to actuate said toggle mechanism and move the joint thereof past dead center in the opposite direction, when said carriage is in said other position, thereby to cause said connecting means to operate said device to release a workpiece.

References Cited by the Examiner
UNITED STATES PATENTS

| | | | |
|---|---|---|---|
| 2,314,123 | 3/1943 | Butterfield. | |
| 2,523,224 | 9/1950 | Medberry | 214—1.7 |
| 2,763,229 | 9/1956 | Sahlin. | |
| 2,843,272 | 7/1958 | Roeber. | |
| 2,899,043 | 8/1959 | Young. | |
| 2,943,750 | 7/1960 | Sehn. | |
| 3,029,957 | 4/1962 | Freeman. | |
| 3,080,840 | 3/1963 | De Man | 113—50 |
| 3,084,820 | 4/1963 | Malo | 294—110 X |

GERALD M. FORLENZA, *Primary Examiner.*

HUGO O. SCHULZ, *Examiner.*